3,260,668
ALKALINE SCALE CONTROL IN SALINE WATER CONVERSION EQUIPMENT

William F. McIlhenny, Lake Jackson, Tex., assignor to The Dow Chemical Company, Midland, Mich., a corporation of Delaware
No Drawing. Filed Nov. 4, 1964, Ser. No. 408,764
2 Claims. (Cl. 210—24)

This invention concerns a method for preventing alkaline scale formation on or in saline water conversion equipment.

When sea water or other saline water, hereinafter "saline water," is heated, alkaline scales form due to the breakdown of the alkalinity to produce carbonate or hydroxyl ions which react with "hardness" ions to precipitate $CaCO_3$ or $Mg(OH)_2$. These scales form on heat transfer surfaces and make the transfer of heat inefficient and difficult.

Currently, the following known methods are used for controlling the formation of alkaline scale when saline water is heated:

(1) *Addition of polyelectrolytes such as starch or polyphosphate polyelectrolytes.*—These are effective at low concentrations of polyelectrolyte and at temperatures below 200° F. Above this temperature, the polyphosphates break down to simple phosphates which are insoluble.

(2) *Recirculation of a slurry of seed crystals of the scale.*—This is troublesome and, in general, not effective in preventing scale formation on the heat transfer surfaces.

(3) *Addition of an acid to neutralize the alkalinity.*—Mineral acids require careful pH control to prevent overacidification and the formation of very corrosive solutions which will attack the heat transfer surfaces. Present practice is to over-acidify to a pH of 3 to 4, then to back-neutralize with a base to a pH of 7. Both excess acid and base are required. Expensive acids such as sulfamic and citric acids have been used at remote locations due to the difficulty in transporting, handling and metering corrosive mineral acids.

It has now been discovered that a weak acid cation exchange resin in the acid form can be used to prevent alkaline scale formation on saline water conversion equipment by removing the carbonate, bicarbonate and hydroxide ions therefrom so that they will not form scales with the hardness cations. The weak acid cation exchange resins ionize in alkaline solutions, i.e., those having a pH above 7, according to the following equation:

$$RCOOH \rightarrow RCOO^- + H^+$$

wherein R represents the resin matrix. Thereafter, the released protons react with hydroxyl ions to form water, with carbonate ions to form bicarbonate ions and with the latter to form $H_2CO_3$. In the heating stage of the saline water conversion, the carbonic acid formed, as indicated, breaks down to give water and carbon dioxide and the latter volatilizes. Thus, the method of this invention prevents the formation of alkaline scales on heat transfer surfaces.

By "saline water" is meant sea water and any other dilute aqueous alkali metal salt solution also containing one or more alkaline earth salts, which saline water has more than 2,500 parts per million (p.p.m.) total dissolved solids (T.D.S.) and generally more than 10,000 p.p.m. T.D.S. Such saline waters are neither potable per se, nor useful as beverage process waters, nor as boiler feed waters.

By a weak acid or carboxylic acid cation exchange resin is meant a resin having combined carboxylic acid functionality, i.e., having —$CO_2H$ substituent groups resulting, for example, from combined acrylic, methacrylic or maleic acid. Representative of such well known polymers are the copolymers of styrene, divinylbenzene and methacrylic acid; copolymers of styrene divinylbenzene and acrylic acid; copolymers of styrene, divinylbenzene and maleic acid; oxidized coal; and the like. Representative resins useful in the practice of this invention are disclosed in U.S. Patents 2,340,110; 2,340,111; 2,409,861; 2,597,437 and 2,768,991.

The saline waters with which this invention is concerned are different from fresh waters in the behavior of $CO_2 \rightleftharpoons H_2CO_3 \rightleftharpoons HCO_3^- \rightleftharpoons CO_3^=$ equilibrium. Specifically:

(1) $CO_2$ is less soluble in saline water than in fresh water.

(2) The dissociation constant of dissolved $CO_2$ is greater in saline water than in fresh water.

(3) The dissociation constant of $CO_2 + OH^- \rightarrow HCO_3^-$ increases with increasing solution concentration.

In sea water and in most brackish waters, exemplary of saline waters, the total hardness greatly exceeds the alkalinity. It is not posible to completely soften sea water by using a carboxylic acid cation exchange resin, and it is not the function of the carboxylic acid resin to act as a water softener by removing calcium and magnesium, in the process of this invention.

In the instant process, only the alkalinity is completely removed thereby rendering saline feed waters fed to a converter non-scaling and thus non-injurious to water conversion process equipment. In other words, the carboxylic acid cation exchange resins used herein are operable and reactable only above a pH of 7, and thus are self-regulating in reducing the pH of saline waters to 7 by neutralization of the alkalinity therein. At this point, any excess carboxylic acid resin becomes nonreactive. The carboxylic acid resins incidentally do combine with some hardness ions, but this is undesirable since their acidity is thereby neutralized and the resins must thereafter be regenerated by acidification with a mineral acid and washing with deionized or cation-free water for re-use.

In practice, a conventional particulate carboxylic acid cation exchange resin is added to the saline water which is passed as feed into the heat exchange circuit or the first effect of a multiple effect evaporator in amount at least sufficiently to react with the alkalinity therein. Any excess resin does no harm. Subsequent heating in the conversion cycle volatilizes carbon dioxide formed as indicated above, which is taken off with some steam from the feed water, and the process steam is then condensed by usual techniques and stored or further processed. The reacted resin slurry may be discarded, or all, or partially collected. The desired portion of the resin slurry in the collector is passed to a separator where most of the water and water-solubles are removed from the resin-containing solids. The resin-containing mixture is then treated with aqueous mineral acid to remove alkaline earth metal ions, washed with water and is thereby regenerated. It can be recycled for re-use.

The following example describes completely a representative specific embodiment and the best mode contemplated by the inventor of carrying out the invention It is not to be taken as limiting the invention other thar as defined in the claims.

Example

Apparatus was set up to pass untreated sea water int two identical 1000 ml. open-top flasks heated with sat urated steam in identical 52-inch coils of ⅛ inch I.L copper tubing. Both flasks and both coils were cleane with dilute HCl and the coils were weighed.

Over a period of three days, 31.7 liters of sea wate were passed through the control unit and 16.9 liters c concentrated blowdown liquor was removed (a ratio of 1.88 to 1). The initial weight of the flask was 285.1 g. After the test period, the weight of the flask was 286.1 g., a gain of 1.0 g. The initial and final weight of the coil was 139.95 and 140.50 g., a gain of 0.55 g. The flask and coil were covered with a white scale identified by chemical analysis as $CaCO_3$.

During the same period, 29.6 liters of the same sea water was passed through the test unit to which had been added 50 ml. of wet $H^+$-form Amberlite IRC–50C resin, a carboxylic acid cation exchange resin. A quantity of 14.8 liters of concentrated blowdown liquor was obtained (a ratio of 2.61 to 1). The flask and the coil gained no weight and neither showed the presence of any scale.

Normal operating temperatures for the conversion of saline water can be employed. The effect of the resin occurs quickly so normal flow of the saline water/resin mixture can be employed. The addition of the resin should not require the process to be slowed down. The equilibrium of ion concentrations will vary with the amount of pressure on the heated mixture because the rate at which $CO_2$ can escape will be affected. The resin will operate whether the heated mixture is under pressure or not. In a saline solution of 3.51 percent total dissolved solids, i.e., normal sea water with an alkalinity of 119.8 mg./liter calculated as $CaCO_3$ by standard procedure, the amount of resin employed should be about one milliliter (wet resin) per 1.925 liters of saline water. More than this amount of resin can be used without detrimental effect. The exact required ratio of resin/saline water can be stoichiometrically calculated for a given saline solution, depending on which resin is being used and the amount of alkalinity in the saline solution. The amount of mineral acid used to regenerate the resin should be enough to substantially replace the hydrogen values on the resin. A stoichiometric amount of acid/resin is sufficient.

What is claimed is:

1. In a method for converting an alkaline saline water containing (a) the cations of one or more alkaline earth metals and (b) the alkaline anions of at least two members of the carbonate, bicarbonate and hydroxide group (c) which saline water has a total dissolved solids content of at least 2500 p.p.m., which method comprises heating said saline water to distill water vapor therefrom and condensing the distilled water vapor as product, the improvement whereby the deposition of alkaline earth metal scales therefrom onto heat transfer surfaces is prevented, comprising (1) adding to said saline water a carboxylic acid cation exchange resin in amount at least sufficient to react with all of said carbonate, bicarbonate and hydroxide anions present in said saline water and whereby said resin also reacts with only such a proportion of alkaline earth cations present as are stoichiometrically equivalent to said anions, and (2) heating said saline water in the presence of said resin (a) to remove carbon dioxide formed by reaction between said carbonate and bicarbonate anions and said resin and (b) to distil water vapor therefrom and condensing and recovering water as product.

2. The process of claim 1 wherein the reacted cation exchange resin is removed from the saline feed water, is treated with dilute mineral acid to remove hardness cations, is washed to remove mineral acid and mineral acid salts of said cations and is then recycled to the process feed in a continuous process.

References Cited by the Examiner

UNITED STATES PATENTS

| 2,214,689 | 9/1940 | Burrell | 210—38 |
| 2,340,110 | 1/1944 | D'Alelio | 210—38 |

OTHER REFERENCES

Kunin: Elements of Ion Exchange, copyright 1960, by Reinhold Publishing Corp., pp. 34 and 35 relied upon.

MORRIS O. WOLK, *Primary Examiner.*

JOSEPH SCOVRONEK, *Examiner.*

E. G. WHITBY, *Assistant Examiner.*